F. E. Oliver,
Belt Fastener.
Nº 40,182.    Patented Oct. 6, 1863.
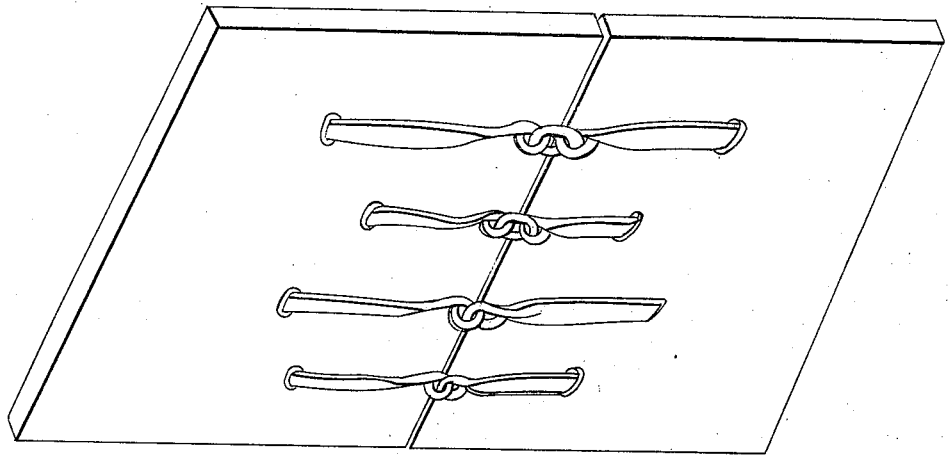
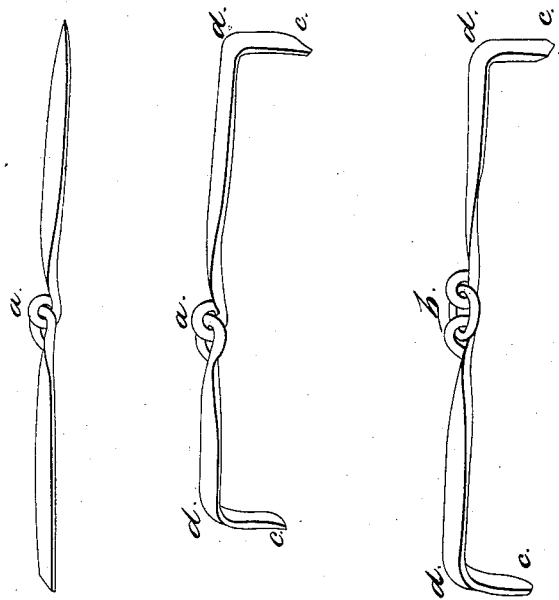
Witnesses.    Inventor.

UNITED STATES PATENT OFFICE.

F. E. OLIVER, OF NEW YORK, N. Y.

IMPROVEMENT IN BELT-HOOKS.

Specification forming part of Letters Patent No. 40,182, dated October 6, 1863.

*To all whom it may concern:*

Be it known that I, F. E. OLIVER, of the city, county, and State of New York, have invented certain new and useful Improvements in the Manufacture of Belt-Hooks for Machine Belts or Bands; and I do declare that the following, taken in connection with the accompanying drawings, is so full and clear a description that others skilled in the manfacture of the same can make and use my improvements.

My invention has reference to the manufacture of belt-hooks for fastening together the ends of machine belting or bands.

Belt-hooks have previously been made of small rigid strips of iron from one to three inches in length, with the ends bent at right angles, or nearly so, toward the center, and put through holes near the ends of the belt, and at equal distances from the ends, against which the ends of the hooks are bent and clinched. Experience has proved that belts fastened by this kind of rigid hook in a short time will work loose or tear out from the belt, for the reason that the holes cannot be placed far enough from the ends. In order to have them take a deeper hold of the belt, the hooks would have to be made much longer, and if much longer they would not conform to the periphery of the pulley over which the belt runs, as they must necessarily conform to the circumference of the pulley while passing over it, and when they have passed the pulley the belt and the hook must straighten, thus making it not only liable to break, but to wear the holes and tear out the belt.

The object of my invention is to obviate these difficulties. My improved hook not only perfectly conforms to the periphery of any pulley, but permits a greater hold being taken on the belt. I obtain this by making a jointed hook, which may be done as exhibited in Figures 1 and 2 at *a*, or by a loop, as seen in Fig. 3, *b*, acting as a hinge, which joint or hinge is on the outside and over the ends of the belt when attached to it.

My hook can be of iron wire or any other suitable material. The ends of the two pieces of wire are first looped, linked, or hinged together, as seen at *a* in Fig. 1. The other ends of the two pieces are then turned down at right angles, or nearly so, with the main lengths, as seen at *d*, Fig. 2. The hook is then complete and ready to be applied, which is done by inserting the ends *c* in holes at suitable distances from the ends of the belt, when the ends of the wire *c* are bent toward the ends of the belt on the under side and clinched. Thus it will be seen that a perfect joint is obtained, and a substantial hold is had on the belt, the joint permitting conformity to any sized pulley, and preventing the working of the clinch or hold on the belt or band, consequently all possibility of its tearing out, as is invariably the case with a rigid or inflexible hook, often causing great destruction to machinery when suddenly stopped by the breaking or separating of the driving-belt.

My jointed belt-hook will not only allow the belt to conform to the periphery of any sized pulley, but will permit the belt to straighten after passing the pulley, and at the same time a deeper hold can be taken on the belt, or alternating deeper holds, the joint remaining the same.

I claim—

1. The method of uniting two or more pieces of belt or driving-band by means of linked bars or rods made of flexible material, so as to allow of their being formed into clamps, substantially in the manner herein set forth.

2. As a new article of manfacture, the belt-fastening device herein described, the same consisting of linked or jointed bars or rods made of a flexible material capable of being bent, substantially as herein set forth.

F. E. OLIVER.

Witnesses:
 E. J. BUTLER,
 S. GREACEN.